United States Patent
Chen (10) Patent No.: US 9,483,707 B2
(45) Date of Patent: Nov. 1, 2016

(54) METHOD AND DEVICE FOR RECOGNIZING A KNOWN OBJECT IN A FIELD OF VIEW OF A THREE-DIMENSIONAL MACHINE VISION SYSTEM

(71) Applicant: GM GLOBAL TECHNOLOGY OPERATIONS LLC, Detroit, MI (US)

(72) Inventor: Zhichao Chen, Woodland Hills, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/614,014

(22) Filed: Feb. 4, 2015

(65) Prior Publication Data

US 2016/0224858 A1  Aug. 4, 2016

(51) Int. Cl.
*G06K 9/62* (2006.01)
*G06K 9/46* (2006.01)
(Continued)

(52) U.S. Cl.
CPC ............. *G06K 9/4642* (2013.01); *G06K 9/00* (2013.01); *G06K 9/4604* (2013.01);
(Continued)

(58) Field of Classification Search
CPC ............ G06K 9/00369; G06K 9/00771;
G06K 2209/01; G06K 9/6256; G06K
9/00234; G06K 9/00268; G06K 9/00281;
G06K 9/4671; G06K 9/00523; G06K 9/4604;
G06K 9/6202; G06K 9/6212; G06K 9/00261;
G06K 9/4652; G06K 9/00577; G06K 9/4676;
H04N 21/466; H04N 19/176; H04N 1/00005;
H04N 2201/3226; H04N 1/00204; H04N
5/2226; H04N 7/181; G06Q 30/0261; G06T
7/0081; G06T 2207/20021; G06T 7/0085;
G06T 7/00; G06T 7/0002; G06T 7/0042;
G06T 2207/10012; G06T 7/0048; G08B
13/19602; G08B 13/19613; G08B 29/188;
G06F 17/30247; G06F 3/013; Y10S 707/915;
B60R 21/01538; B60R 21/01552
USPC ....... 382/100, 173, 155, 180, 206, 199, 225;
348/155, 169
See application file for complete search history.

(56) References Cited

U.S. PATENT DOCUMENTS

| | | | | |
|---|---|---|---|---|
| 4,928,313 A | * | 5/1990 | Leonard ............... | G01N 21/956 348/126 |
| 5,436,981 A | * | 7/1995 | Ishikawa ............... | G06T 11/60 358/462 |

(Continued)

OTHER PUBLICATIONS

Wei Wang, Shile Li, Lili Chen, Dongming Chen, Kolja Kuhnlenz, "Fast Object Recognition and 6D Pose Estimation Using Viewpoint Oriented Color-Shape Histogram", http://www.pointclouds.org, http://www.qualisys.com, 6pps.

(Continued)

*Primary Examiner* — Vu Le
*Assistant Examiner* — Aklilu Woldemariam
(74) *Attorney, Agent, or Firm* — Quinn Law Group, PLLC (57) ABSTRACT

A method for recognizing a known object in a field of view of a three-dimensional (3D) vision system includes capturing a bitmap image file of the field of view and executing a first feature extraction to generate appearance features including a color histogram and an edge direction histogram. A reduced search space is identified based upon the appearance features including the color histogram and the edge direction histogram. A second feature extraction of the bitmap image file is executed to identify geometric features including a viewpoint feature histogram and an ensemble of shape functions. The appearance features and the geometric features are fused with contents of the reduced search space. The fused appearance features, geometric features and contents of the reduced search space are compared with a plurality of predetermined partial views of a plurality of known objects to recognize one of the known objects.

8 Claims, 3 Drawing Sheets

(51) Int. Cl.
 *G06K 9/52* (2006.01)
 *H04N 13/02* (2006.01)
 *G06K 9/00* (2006.01)

(52) U.S. Cl.
 CPC ......... *G06K 9/4652* (2013.01); *G06K 9/4661* (2013.01); *G06K 9/52* (2013.01); *G06K 9/62* (2013.01); *G06K 9/6201* (2013.01); *G06K 9/627* (2013.01); *H04N 13/0203* (2013.01)

(56) References Cited

U.S. PATENT DOCUMENTS

| | | | | |
|---|---|---|---|---|
| 5,966,473 A * | 10/1999 | Takahashi | ............ | G06K 9/2054 345/441 |
| 6,111,974 A * | 8/2000 | Hiraoglu | ................ | G01V 5/005 250/363.04 |
| 6,671,049 B1 * | 12/2003 | Silver | ................... | G03F 9/7076 356/399 |
| 7,227,893 B1 * | 6/2007 | Srinivasa | ........... | G06K 9/00771 348/155 |
| 8,290,253 B1 * | 10/2012 | Wang | .................. | G06K 9/4652 382/162 |
| 8,755,837 B2 * | 6/2014 | Rhoads | ............ | G06F 17/30244 382/162 |
| 8,897,578 B2 * | 11/2014 | Huang | ................ | G06K 9/4676 382/173 |
| 2002/0041705 A1 * | 4/2002 | Lin | ...................... | G06K 9/3241 382/165 |
| 2002/0044689 A1 * | 4/2002 | Roustaei | ................ | G03F 7/705 382/199 |
| 2004/0136609 A1 * | 7/2004 | Ichikawa | ............. | G06T 7/0081 382/284 |
| 2008/0247655 A1 * | 10/2008 | Yano | ...................... | H04N 19/63 382/232 |
| 2012/0062957 A1 * | 3/2012 | Safonov | ............... | G06F 3/1219 358/3.01 |

OTHER PUBLICATIONS

Pllinio Moreno, Jonas Hornstein, Jose Santos-Victor, "Learning to grasp from point clouds", Instituto Superior Tecnico & Instituto de Sistemas e Robotica, Lisboa, Portugal, 11 pps.

* cited by examiner

METHOD AND DEVICE FOR RECOGNIZING A KNOWN OBJECT IN A FIELD OF VIEW OF A THREE-DIMENSIONAL MACHINE VISION SYSTEM

TECHNICAL FIELD

The disclosure relates to a machine vision system, and methods for recognizing an object of interest.

BACKGROUND

Computer vision is the scientific discipline of making machines that can "see" so that they can extract information from an image and based on the extracted information perform some task or solve some problem. The image data can take many forms, such as still images, video, views from multiple cameras, or multi-dimensional data from a medical scanner.

Known robotic perception systems achieve desired performance and reliability by engineering specific lighting conditions, structuring viewing conditions and exploiting process configuration. They are flexible under a narrow range of conditions that work only in a subset of real-world conditions, and may breakdown with minor changes in the surrounding environment. In addition, processing speed of known systems and related techniques is not sufficient for efficient real-time processing. Turnkey commercial machine vision systems can be slow when introducing wider flexibility and are made to work robustly by rigorously structuring the domain. For example, processing a large field-of-view (FOV) searching for objects in unexpected orientations that occupy 5-10% of FOV could take several seconds or more. This is further compounded when searching for front/back/side views to precisely find an object location and pose. Furthermore, cost associated with structuring the surroundings for known automation solutions for robot material transfer and handling applications can be three to ten times the cost associated with the robotic device. The range of products that can be efficiently handled can be limited in known automation systems and is often restricted to just a handful of styles. Furthermore, such systems are cumbersome to retool and slow to reconfigure for a different class of products. Thus, existing automation solutions are not readily applicable in assembly operations that deal with a wide diversity of parts due to issues related to investment, operations cost, flexibility and reconfigurability.

SUMMARY

A method for recognizing a known object in a field of view of a three-dimensional (3D) vision system includes capturing a bitmap image file of the field of view employing the machine vision system and executing a first feature extraction of the bitmap image file to generate appearance features including a color histogram and an edge direction histogram. A reduced search space is identified based upon the appearance features including the color histogram and the edge direction histogram. A second feature extraction of the bitmap image file is executed to identify geometric features including a viewpoint feature histogram and an ensemble of shape functions associated therewith. The appearance features and the geometric features are fused with contents of the reduced search space. The fused appearance features, geometric features and contents of the reduced search space are compared with a plurality of predetermined partial views of a plurality of known objects to recognize one of the known objects.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
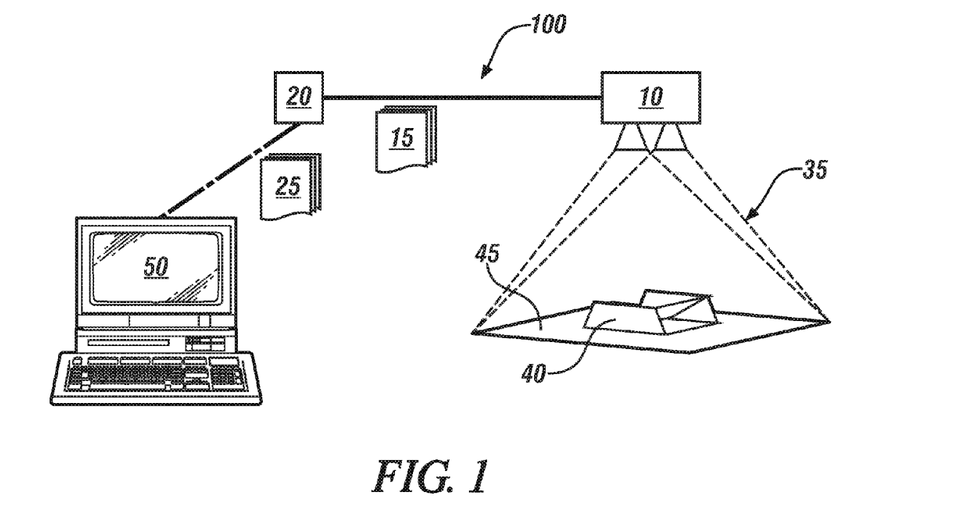
FIG. 1 schematically illustrates a machine vision system for capturing, processing and storing an image of a field of view (FOV), including an image detector (camera) signally connected to an encoder signally connected to a controller, in accordance with the disclosure.

Referring now to the drawings, wherein the depictions are for the purpose of illustrating certain exemplary embodiments only and not for the purpose of limiting the same, FIG. 1 schematically illustrates an exemplary machine vision system 100 for capturing, processing and storing an image of a field of view (FOV) 35, including an image detector (camera) 10 signally connected to an encoder 20 signally connected to a controller 50. The camera 10 is preferably a stereo device capable of capturing a three-dimensional (3D) image 15 of the FOV 35. The camera 10 can be at any position and orientation relative to a known object 40 in the FOV 35, with the known object 40 oriented on a plane 45. The known object 40 is a structural entity having pre-defined features including by way of example spatial dimensions, materials and surface finishes indicating reflectivity, among others. Like terms and like numerals refer to like elements throughout the descriptions and drawings.

In one embodiment, the 3D image 15 captured by the camera 10 in the form of a 24-bit stereo image including RGB (red-green-blue) values and depth values that represent the FOV 35. Other embodiments of the 3D image 15 can include a 3D image depicting a black-and-white or a gray-scale representation of the 3D FOV, and other image representations without limitation. The camera 10 includes an image acquisition sensor that signally connects to the encoder 20 that executes digital signal processing (DSP) on the 3D image 15. The image acquisition sensor captures the 3D image 15 as a plurality of pixels in the FOV 35 at a predetermined resolution, and the encoder 20 encodes the pixels in the FOV 35 to generate a bitmap image file 25 of the FOV 35, e.g., an 8-bit bitmap of the pixels representing the FOV 35 at a predefined resolution. The bitmap image file 25 is communicated to the controller 50. The bitmap image file 25 is an encoded datafile stored in a non-transitory digital data storage medium in one embodiment. The bitmap image file 25 includes a digital representation of a 3D image that may include one or a plurality of known objects 40, and represents an original image of the FOV 35 captured at the original resolution of the camera 10. The plurality of known objects 40 may all be of the same design, or may be dissimilar designs. The 3D image 15 of the known object 40 captured by the camera 10 contains sufficient information to evaluate the position of the known object 40 in relation to the camera 10 and also permit evaluation of the data in the bitmap image file 25 to generate a Hue-Saturation-Value or Brightness (HSV) model and a Color Histogram (CH) of the FOV 35. The shape of each known object 40 depends upon the relative viewing angles and distance between the camera 10 and the known object 40 after influences associated with illumination and reflectivity have been accounted for and the camera 10 has been calibrated.

Controller, control module, module, control, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality, including data storage and data analysis. Software, firmware, programs, instructions, routines, code, algorithms and similar terms mean any controller-executable instruction sets including calibrations and look-up tables.

Figure 2:
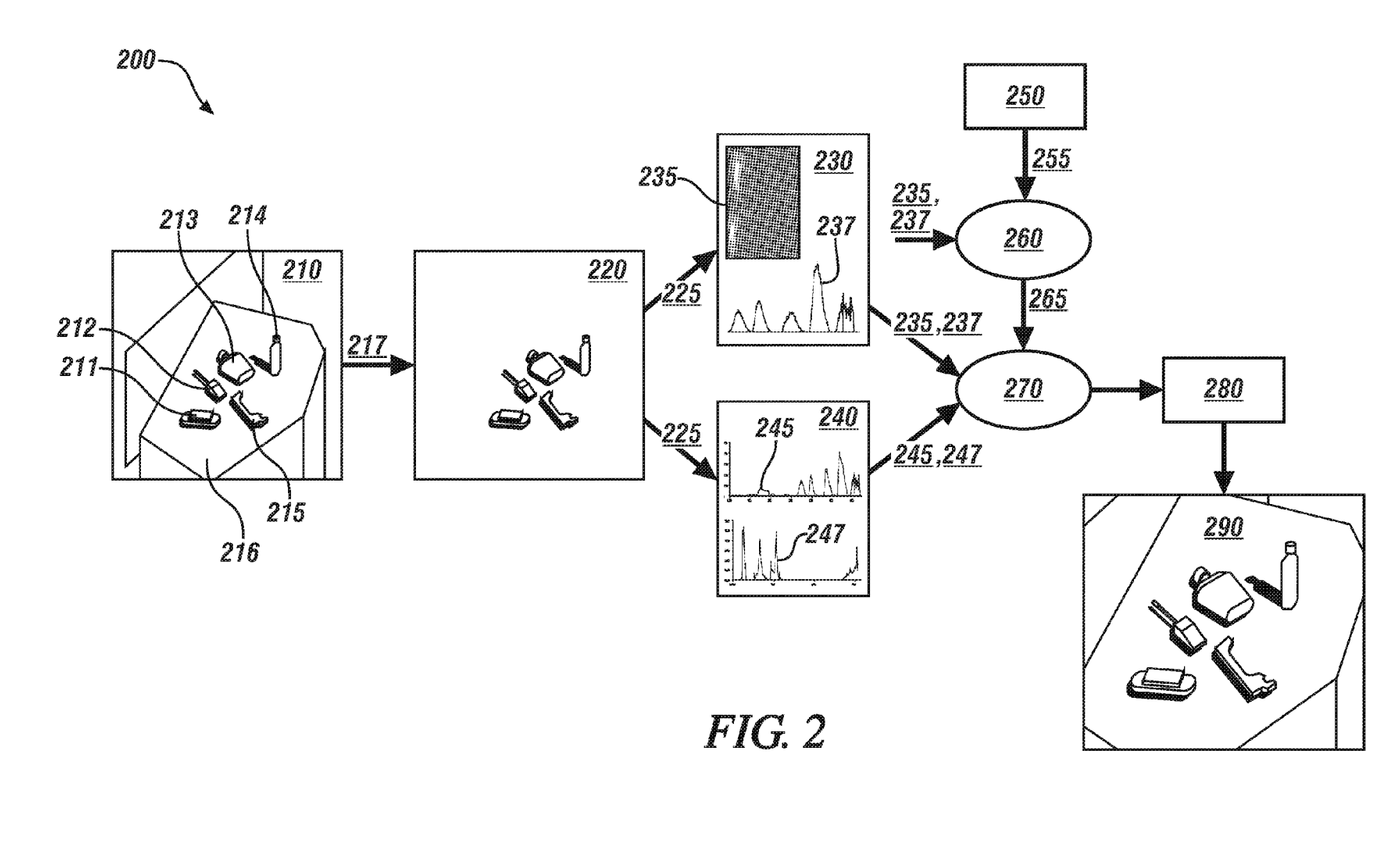
FIG. 2 shows a schematic block diagram of an object recognition process to effect machine recognition of one or a plurality of known objects in a FOV of a camera by combining 2D local features and 3D global features, in accordance with the disclosure.

FIG. 2 shows a machine-executed vision-based object recognition process 200 in the form of a block diagram to recognize one or a plurality of known objects by combining 2D local features and 3D global features in a bitmap image file of an FOV. The bitmap image file of the FOV is in the form of an input point cloud 217 that can be captured employing an embodiment of the machine vision system 100 described with reference to FIG. 1. The steps of the object recognition process 200 are preferably sequentially executed with increased complexity to extract, compare and refine features to recognize an object employing the machine vision system 100, which can be employed by a robotic system for material management, grasping and other operations. The object recognition process 200 employs object segmentation and object recognition using identifiable multimodal features that are captured by the machine vision system 100.

Execution of the object recognition process 200 is preceded by execution of an object recognition training process 250, which is a process for collecting a plurality of partial views of each of a plurality of known objects that includes identifying 3D global features and 2D local features that are stored in and retrievable from a partial view database 255. Preferably the object recognition training process 250 is executed off-line with the results analyzed, verified and captured in a retrievable form.

The object recognition process 200 starts from low-level processing using appearance-based cues and proceeds to high-level object representation by fusion of both 2D and 3D cues to effect machine recognition of one or a plurality of known objects.

By way of example to describe operation of the object recognition process 200, an arbitrary arrangement of known objects 211, 212, 213, 214 and 215 on a planar surface 216 is captured as a bitmap image file in the form of an input point cloud 217 using an embodiment of the machine vision system 100 (210). The known objects 211, 212, 213, 214 and 215 include a switch 211, radio 212, canteen 213, spray bottle 214 and handle 215 that are arbitrarily selected for purposes of illustration.

The input point cloud 217 is subjected to segmentation to remove data representing the planar surface 216 from the input point cloud 217 (220), resulting in a segmented image datafile 225. This includes identifying portions of the input point cloud 217 representing the planar surface 216 and removing them or otherwise rendering them non-functional, and thus not subject to further analysis.

The segmented image datafile 225 is subjected to 2D feature extraction (230) and 3D feature extraction (240). The 2D feature extraction (230) includes identifying individual items in the segmented image datafile 225 based upon 2D appearance features. Extraction of the 2D appearance features is effected by developing a Color Histogram (CH) 235 and an edge direction histogram (EDH) 237 from the segmented image datafile 225. The CH 235 is preferably based upon a Hue-Saturation-Value or Brightness (HSV) model of the color space, which defines a color space in terms of the components of hue, saturation and value. The hue indicates the color type on the visible spectrum, such as red, orange, yellow, etc. Hue preferably ranges in value from 0 to 179, with red at 0, green at 60, blue at 120, and so on. The saturation indicates the purity of the color, with a decreasing value for saturation of a color indicating increasing presence of "grayness" and increasing fading of the color. The saturation of the color ranges in value from 0 to 255, with 0 representing black-gray-white and 255 represented pure spectrum color. The value or brightness indicates intensity of the color and ranges from 0 to 100%. The HSV model provides a nonlinear transformation of the RGB color space.

The CH 235 represents a distribution of colors in the segmented image datafile 225, and includes a numerical count of pixels that have colors in each of a list of color ranges across the color spectrum. In one embodiment, only the hue and saturation values are employed to minimize lighting effects. Hue varies from 0 to 179 and saturation varies from 0 (black-gray-white) to 255 (pure spectrum color). In one embodiment, the hue is quantized to 15 levels and the saturation is quantized to 16 levels. The CH 235 provides a statistical approximation of an underlying continuous distribution of color values.

The EDH 237 is a multi-bin histogram that captures local edge distribution to represent the frequency and the directionality of the brightness changes of an object captured in the segmented image datafile 225. The segmented image datafile 225 representing the 2D object is split into 4×4 non-overlapping rectangular regions. In each region, The EDH 237 computes four directional edges (horizontal, vertical, two diagonals) and one non-directional edge.

The CH 235 and the EDH 237 are compared to 2D appearance features for each of a plurality of partial views of known objects that are stored in the partial view database 255 (260) to narrow down and reduce the search space in the segmented image datafile 225 that is associated with one or more known objects. Those partial views in the partial view database 255 that have overall similarity in appearance with respect to segmented image datafile 225 are selected based on a fused decision given by 2D color and edge direction classifiers associated with the CH 235 and the EDH 237, respectively. Thus a reduced search space 265 of the segmented image datafile 225 is identified.

The segmented image datafile 225 is subjected to 3D feature extraction (240), which includes evaluating 3D geometric features including a viewpoint feature histogram (VFH) 245 and an ensemble of shape functions (ESF) 247 for the datapoints of the segmented image datafile 225. The VFH 245 includes a point feature histogram (PFH) and a viewpoint component histogram.

Figure 3:
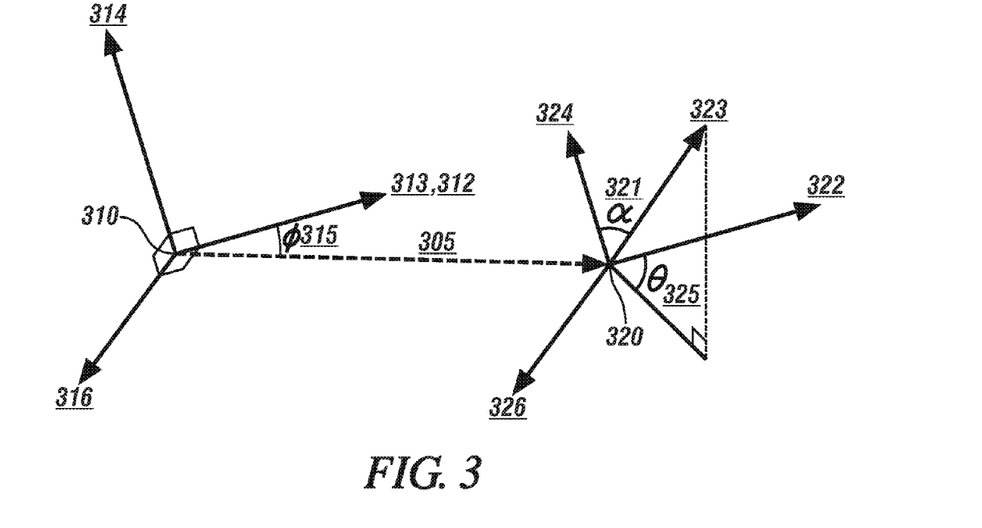
FIG. 3 graphically illustrates vectors for a single point pair Pt and Ps and an associated point vector representing neighboring points in a segmented image datafile extracted from the input point cloud in accordance with the disclosure.

FIG. 3 graphically illustrates vectors for a single point pair Pt 320 and Ps 310 representing any two neighboring or contiguous points in the segmented image datafile 225 extracted from the input point cloud 217 and an associated point vector 305. In one embodiment, a k-dimensional or k-d tree-based nearest neighbor search is employed to compare the features. A k-d tree is a space-partitioning data structure for organizing points in a k-dimensional space for effecting a search involving a multidimensional search key, e.g., range searches and nearest neighbor searches. K-d-tree-based nearest neighbor search processes are known. The single point pair Pt 320 and Ps 310 provides an example of elements populating a point feature histogram (PFH) of the VFH 245. Point vector 305 is a line between points Pt 320 and Ps 310. This characterization using the PFH of the VFH 245 is executed to provide a geometric description of the points contained in the segmented image datafile 225 in a manner that permits machine recognition. Point Ps 310 is characterized in context of first 3D axes including us 312, vs 314 and ws 316, with vector ns 313 representing a normal for point ps 310. Point Pt 320 is characterized in context of second 3D axes including ut 322, vt 324 and wt 326, with vector nt 323 characterized by a first angle θ 325 in a first plane defined by axes u 322 and w 326 and a second angle α 321 in a second plane defined by axes u 322 and v 324.

The first 3D axes including us 312, vs 314 and ws 316 correspond to second 3D axes including ut 322, vt 324 and wt 326, respectively, translated along point vector 305. Vector ns 313 represents a normal for point ps 310 that is parallel to the ut axis 322 and defines a third angle φ 315 that is between the vector ns 313 and the point vector 305. Vector nt 323 represents a surface normal for point pt 320 and is characterized by a first angle θ 325 in a first plane defined by axes u 322 and w 326 and a second angle α 321 in a second plane defined by axes u 322 and v 324.

The PFH encodes the statistics of the shape of a point cloud, e.g., the input point cloud 217 described with reference to FIG. 2, by accumulating the geometric relations between all the point pairs of the segmented image datafile 225 extracted from the input point cloud 217. Given a pair of points in the neighborhood and their normal, e.g., as described with reference to FIG. 3, the PFH accumulates a four dimensional histogram including a cosine of the second angle α 321, the cosine of the third angle φ 315, the first angle θ 325 and the distance between the points Pt 320 and Ps 310 normalized to the neighborhood. The PFH parameters include the dimensions considered to compute the histogram and the number of bins for each of the dimensions.

The angles including first angle Θ 325, second angle α 321 and third angle φ 315 represent pairwise pan, tilt and yaw angles, with the foregoing angles determined for every pair of normals for an identified surface patch in a segmented image datafile 225. This feature does not make use of color information.

Figure 4:
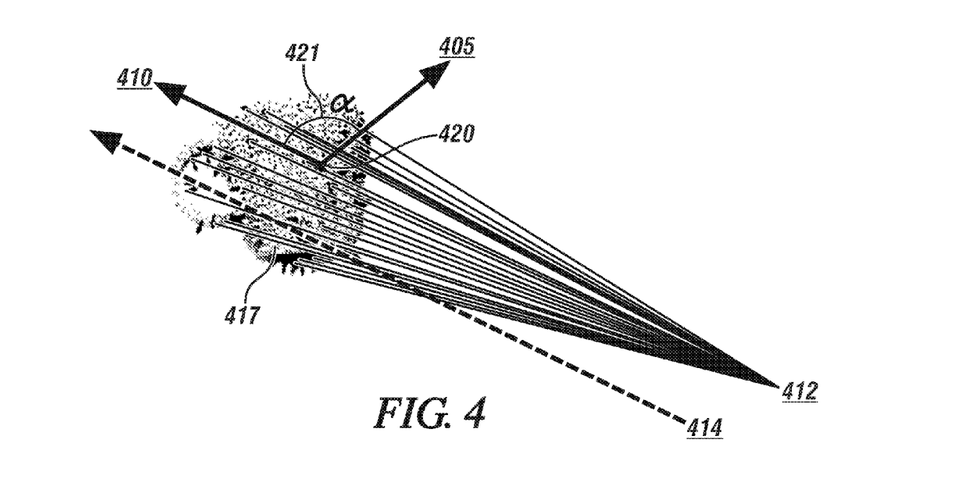
FIG. 4 graphically illustrates an example of a viewpoint component histogram that collects angles between the viewpoint direction and each normal, in accordance with the disclosure.

FIG. 4 graphically illustrates an example of a viewpoint component that is computed by collecting a histogram of relative angles α 421 between the viewpoint 412, a central viewpoint direction indicated by line 410 and each of a plurality of surface normals ni 405 for an input point cloud 417, wherein the input point cloud 417 corresponds to the input point cloud 217 described with reference to FIG. 2. The surface normals ni 405 is for a single point of the input point cloud 417. Each point of the input point cloud 417 has a surface normal (not shown). Line 414 provides a viewpoint direction, and line 410 is a central viewpoint direction that is parallel to the viewpoint direction with a point of origin that corresponds to a central point 420 of the input point cloud 417. The relative angles α 421 are employed to construct the viewpoint component which includes statistics of the relative angles α 421 between the surface normal ni 405 and the central viewpoint direction 410. The viewpoint component is computed by collecting a histogram of the angles that the viewpoint direction 414 makes with each surface normal ni 405, which includes the angle between the central viewpoint direction that is translated to each surface normal ni 405. The second component measures the relative pan, tilt and yaw angles as described with reference to FIG. 3 that are measured between the viewpoint direction 410 at the central point 420 and each of the normals 405 on the surface.

Figure 5:
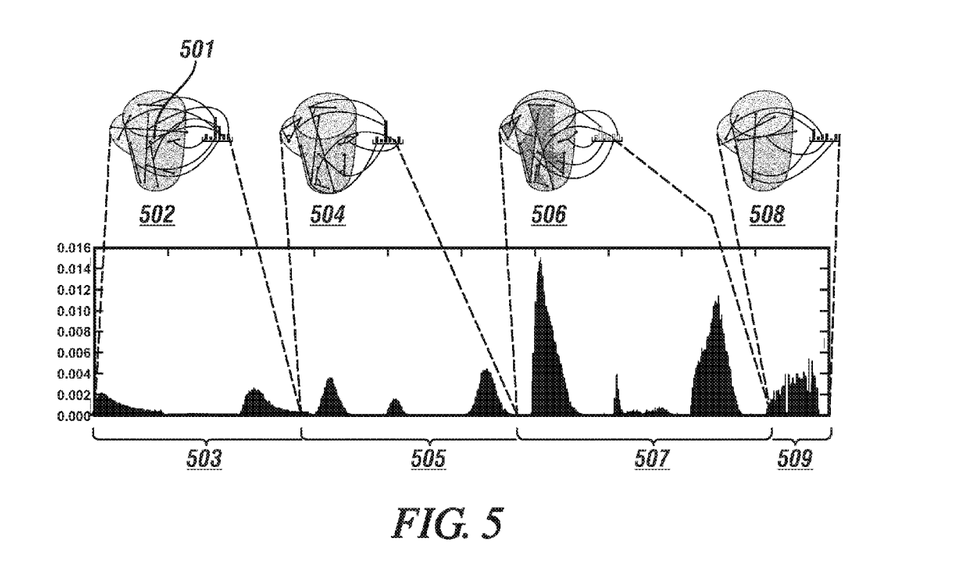
FIG. 5 graphically illustrates an example of an Ensemble of Shape Functions (ESF) applied to a point cloud including a 3D object, in accordance with the disclosure.

FIG. 5 graphically illustrates an example of an Ensemble of Shape Functions (ESF) applied to an input point cloud that includes a 3D object 501, which is also shown. One segmented image datafile 225 that includes the 3D object 501 extracted from an input point cloud is described with reference to FIG. 2. The 3D object 501 is shown as a non-limiting illustration of a 3D object. The ESF includes histograms of shape functions related to the 3D object 501 including ensemble D2 502 and associated histogram 503, ensemble A3 504 and associated histogram 505, ensemble D3 506 and associated histogram 507, and ensemble Ratio 508 and associated histogram 509. Each of the histograms 503, 505, 507 and 509 includes frequency of occurrence on the vertical axis in relation to each line. The ensemble D2 502 and associated histogram 503 is developed based upon distances between randomly sampled points selected from the input point cloud representing the 3D object 501. The ensemble A3 504 and associated histogram 505 is developed based upon enclosed angles between two random lines selected from the input point cloud representing the 3D object 501. The ensemble D3 506 and associated histogram 507 is developed based upon areas spanned by three randomly sampled points selected from the input point cloud representing the 3D object 501. The ensemble Ratio 508 and associated histogram 509 is developed based upon ratios of random lines lying out of surface and on the surface of the 3D object 501 that are selected from the input point cloud representing the 3D object 501.

Referring back to FIG. 2, the viewpoint feature histogram (VFH) 245 and an ensemble of shape functions (ESF) 247 and the Color Histogram (CH) 235 and edge direction histogram (EDH) 237 are compared with contents of the reduced search space 265 of the segmented image datafile 225 to effect fusing of the features from the VFH 245, the ESF 247, the CH 235, the EDH 237 and contents of the reduced search space 265 (270). Fusion of the aforementioned features is motivated based on a human recognition pathway in which human recognition starts from low-level processing using appearance-based cues, to high-level object representation by fusion of multiple geometric cues. Color and shape convey information quickly, which facilitates visual search for human perception system in the physical world after narrowing down the search space from the partial view database 255 by 2D appearance features. Those partial views in the partial view database 255 that have overall similarity in appearance with respect to an input object are selected based on a fused decision given by 2D color and edge direction classifiers.

The fusion of features associated with a 2D fusion includes comparing the 2D features of an object with features of partial views of known objects stored in the partial view database 255. This includes comparing the CH 235 and EDH 237 with contents of the partial view database 255. A weighted sum is used to combine the two matching scores:

$$S_{2d} = \omega S_{ch} + (1-\omega) S_{edh} \qquad [1]$$

wherein $S_{ch}$ and $S_{edh}$ are Euclidian distances of between test and training features in color and edge direction, respectively, and quantified in the CH 235 and the EDH 237. The matching scores are normalized using a maximum normalization. The term w is the weight for one of the two features, which is 0.6 in one embodiment.

An adaptive boosting (Adaboost) learning algorithm combining 3D geometric and 2D appearance features is carried out on the reduced search space to select the most effective features for the final decision that correlates each portion of the segmented image datafile 225 with one of the known objects (280). Adaptive Boosting (Adaboost) is an approach to machine learning that creates a highly accurate prediction rule by combining many relatively weak and inaccurate rules or classifiers. As long as each weak classifier performs with at least 50% success, and the errors of the different classifiers are independent, then the algorithm is able to improve upon the error rate by optimally selecting weights for the weak classifiers. In this case, four weak classifiers are employed, e.g. the two 2D features including CH 235 and EDH 237 and two 3D features including the VFH 245 and ESF 247.

Execution of this part of the Adaboost process includes, by way of example, letting $h_n$ be the nth weak classifier, and letting $y=h_n(x)$ be the output of the classifier to input x. In this case, x is the input object and y is a binary label indicating whether an object is recognized by the weak classifier. The strong classifier is given by a weighted sum of the weak classifiers:

$$\Psi(x) = \text{sign}(\Sigma^N_{n=1} \alpha_n h_n(x)) \qquad [2]$$

wherein $\alpha_n$ is the scalar weight found by AdaBoost indicating the importance of the weak classifier $h_n$, and N=4. The weights are determined in an iterative manner according to $$\alpha_n = \frac{1}{2}\left(\ln \frac{1-\varepsilon_n}{\varepsilon_n}\right) \qquad [3]$$

where the error $\varepsilon_n$ is determined as follows.

$$\varepsilon_n = P_{r_i \sim D_n}[h_n(x_i) \neq y_i] = \Sigma_{i:h_n(x_i) \neq y_i} D_n(i) \qquad [4]$$

In this equation the output $y_i \in \{-1, +1\}$ is the ground truth for the training set, and $D_n(i)$ is the weight assigned to the ith training example on round n.

Thus, the object segmentation and object recognition is optimized using multimodal features from arbitrary viewpoints for robotics applications by combining both 2D local and 3D global features into multi-modal optimization to achieve high object recognition rates and very low false alarms. This permits fusing geometric and visual features efficiently in a unified manner, e.g., using Adaboost, and classifying both textured and untextured objects from arbitrary viewpoints using partial-view modeling. The partial-view matching allows rough pose estimation for quick precision pose alignment. Such functionality enhances the autonomy of robot for object manipulation and human-robot cooperation for manufacturing.

Referring again to FIG. 2, results of the fusing geometric and visual features efficiently in a unified manner, e.g., using Adaboost, and classifying both textured and untextured objects from arbitrary viewpoints using partial-view modeling results in the object recognition process 200 effecting machine recognition of the known objects 211, 212, 213, 214 and 215 as switch 211, radio 212, canteen 213, spray bottle 214 and handle 215, respectively (290).

A vision-based approach as described herein automatically recognizes a known object in the FOV. This capability enables a device, e.g., a robotic arm to localize objects for grasping and/or manipulation by extracting attributes about an object in context of its surroundings with flexible matching for a wide range of objects and conditions, orientations, lighting, points of view, occlusions, background and spatial awareness. The approach described herein leverages both appearance and geometry to both localize and recognize an object and can utilize the range information from a depth sensor into the pose optimization algorithm to boost accuracy. The use of multi-sensory perception speeds up classification and searching by incorporating multi-sensory perception attention mechanisms and by developing classifier taxonomies for rapidly parsing through a wide variety of objects.

A method of object recognition as described herein facilitates deployment of automation systems by providing high levels of flexibility and reconfigurability. The concepts described herein allow flexibility and convertibility using minimal infrastructure with a certain degree of first generation humanoid robot automation in assembly operations such as bin-picking or material handling. It also enables robust and autonomous assembly capability, finding of parts in less structured environments, visual confirmation of tasks, and ready manipulation of complex and flexible parts. The system described herein enables a robotic arm to complement the role of humans in the assembly line and reduce worker time spent on routine, non-critical, repetitive assembly process functions that are within the near term capabilities of dexterous humanoid robots. The system described herein enables a robotic arm to handle semi-rigid, rigid, prismatic parts of a variety of shapes and forms, rapidly detect many objects, and have the ability to learn models for new objects in a semi-automated manner. This capability is necessary and critical for enabling robots that can work in tandem with humans using the same process infrastructure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for recognizing a known object in a field of view of a machine vision system, comprising:

capturing a bitmap image file of the field of view employing the machine vision system;

executing a first feature extraction of the bitmap image file to generate appearance features including a color histogram and an edge direction histogram, wherein the color histogram includes the bitmap image file quantized for hue and color saturation, and wherein the edge direction histogram includes the bitmap image file quantized for frequency and directionality of brightness changes of an object captured in the bitmap image file;

identifying a reduced search space based upon the appearance features, including comparing the color histogram and the edge direction histogram with features of partial views of the known objects, wherein the reduced search space includes a portion of data contained in the bitmap image file;

executing a second feature extraction of the bitmap image file to identify geometric features including a viewpoint feature histogram and an ensemble of shape functions associated with the bitmap image file, wherein the viewpoint feature histogram is determined by encoding statistics of a shape of an input point cloud associated with the bitmap image file by accumulating geometric relations between all point pairs;

fusing the appearance features and the geometric features with the reduced search space;

wherein said fusing includes comparing the fused appearance features, geometric features and the reduced search space with a plurality of predetermined partial views of a plurality of known objects; and recognizing, by the controller, one of the known objects based upon the comparing.

2. The method of claim 1, wherein accumulating geometric relations between all point pairs of the input point cloud comprises accumulating a four dimensional histogram between each of the point pairs.

3. A machine-executed vision-based object recognition process, comprising:

capturing a plurality of predetermined partial views for each of a plurality of known objects;

capturing, via a machine vision system, a bitmap image file including a 3D image of the field of view including at least one of the known objects employing the machine vision system;

executing, by a controller, a two-dimensional (2D) feature extraction of the bitmap image file to generate 2D appearance features including a color histogram and an edge direction histogram, wherein the color histogram includes the bitmap image file quantized for hue and color saturation, and wherein the edge direction histogram includes the bitmap image file quantized for frequency and directionality of brightness changes of an object captured in the bitmap image file;

identifying a reduced search space based upon the appearance features, including comparing the color histogram and the edge direction histogram with features of partial views of the known objects, wherein the reduced search space includes a portion of data contained in the bitmap image file;

executing a 3D feature extraction of the bitmap image file to identify geometric features including a viewpoint feature histogram and an ensemble of shape functions associated with the bitmap image file, wherein the viewpoint feature histogram is determined by encoding statistics of a shape of an input point cloud associated with the bitmap image file by accumulating geometric relations between all point pairs;

fusing the appearance features and the geometric features with the reduced search space;

wherein said fusing includes comparing the fused appearance features, geometric features and contents of the reduced search space with the plurality of predetermined partial views of the plurality of known objects; and recognizing, by the controller, one of the known objects based upon the comparing.

4. A machine vision device, comprising:

an image detector signally connected to an encoder signally connected to a controller; and the controller executing a vision-based object recognition process, including the following steps:

capturing, via the image detector and encoder, a bitmap image file including a 3D image of the field of view including at least one of the known objects employing the machine vision system;

executing a two-dimensional (2D) feature extraction of the bitmap image file to generate 2D appearance features including a color histogram and an edge direction histogram, wherein the color histogram includes the bitmap image file quantized for hue and color saturation, and wherein the edge direction histogram includes the bitmap image file quantized for frequency and directionality of brightness changes of an object captured in the bitmap image file;

identifying a reduced search space based upon the 2D appearance features, including comparing the color histogram and the edge direction histogram with features of partial views of the known objects, wherein the reduced search space includes a portion of data contained in the bitmap image file;

executing a 3D feature extraction of the bitmap image file to identify geometric features including a viewpoint feature histogram and an ensemble of shape functions associated with the bitmap image file, wherein the viewpoint feature histogram is determined by encoding statistics of a shape of an input point cloud associated with the bitmap image file by accumulating geometric relations between all point pairs;

fusing the appearance features and the geometric features with the reduced search space;

wherein the comparing includes comparing the fused appearance features, geometric features and the reduced search space with a plurality of predetermined partial views of the plurality of known objects; and recognizing one of the known objects based upon the comparing.

5. The method of claim 2, wherein the four dimensional histogram is related to a first angle, a second angle, a third angle and a distance between the points of each of the point pairs.

6. The method of claim 5, wherein the four dimensional histogram related to the first angle, the second angle, the third angle and the distance between the points of the point pair include a first angle $\theta$, a cosine of the second angle $\alpha$, a cosine of the third angle $\phi$, and a distance between the points of the point pair.

7. The method of claim 6, wherein the first angle $\theta$, second angle $\alpha$ and third angle $\phi$ represent corresponding pairwise pan, tilt and yaw angles that are determined for every pair of points of the point pair.

8. The method of claim 6, wherein the distance between the points of the point pair is normalized.

* * * * *